United States Patent [19]

Schliesser et al.

[11] Patent Number: 5,730,649

[45] Date of Patent: Mar. 24, 1998

[54] DEVICE FOR MAKING SAUSAGES

[75] Inventors: Gerhard Schliesser, Wain; Karl Burger, Ingoldingen-Muttensweilen, both of Germany

[73] Assignee: Albert Handtmann Maschinenfabrik GmbH & Co. KG, Germany

[21] Appl. No.: 644,205

[22] Filed: May 10, 1996

[30] Foreign Application Priority Data

May 18, 1995 [DE] Germany ............... 295 08 291 U

[51] Int. Cl.⁶ .................................................. A22C 15/00
[52] U.S. Cl. ........................................... 452/51; 452/186
[58] Field of Search ............................ 452/51, 186, 47

[56] References Cited

U.S. PATENT DOCUMENTS

| | | | |
|---|---|---|---|
| 3,964,129 | 6/1976 | Townsend | 452/51 |
| 5,013,279 | 5/1991 | Southworth | 452/46 |
| 5,073,142 | 12/1991 | Kasai et al. | 452/46 |
| 5,163,864 | 11/1992 | Burger et al. | 452/51 |
| 5,183,433 | 2/1993 | Townsend et al. | 452/46 |
| 5,197,915 | 3/1993 | Nakamura et al. | 452/51 |

FOREIGN PATENT DOCUMENTS

| | | |
|---|---|---|
| A1-0189763 | 1/1986 | European Pat. Off. |
| B1-482368 | 3/1996 | European Pat. Off. |
| 598766 | 5/1978 | Germany . |

Primary Examiner—Willis Little
Attorney, Agent, or Firm—Tilton, Fallon, Lungmus & Chestnut

[57] ABSTRACT

The present invention relates to a device for making and transferring natural skin sausages formed in coherent chains to a smoke stick. To design a device of this type in such a manner that it is suited for automatically or semiautomatically transferring chains of natural skin sausages to a smoke stick, the filling tube has arranged downstream thereof a transportation device to which the natural skin sausages are transferred with the aid of a transfer chute which is provided with an access space for an operator's hand.

5 Claims, 2 Drawing Sheets

DEVICE FOR MAKING SAUSAGES

BACKGROUND OF THE INVENTION

The present invention relates to a device for making and transferring natural skin sausages formed in coherent chains to a smoke stick, the device comprising a filling tube over which natural skin is slid to be filled with sausage meat.

Many types of devices for making and transferring sausages formed in chains are known in the prior art (see, for example, EP-A1-0482 368). To be in a position to exploit the high outputs that are in principle possible with sausage filling machines when sausages are further processed, attempts have been made to transfer the sausage chains or strings formed behind the filling tube in a substantially automatic manner and in loops to smoke sticks from where they can then be moved easily into smoking chambers.

In the prior art the sausages are handed over to a transportation belt directly behind the filling tube. Upon further transportation with the aid of the transportation belt the sausages are made uniform and will fall, in the end, onto a transportation means. This transportation means includes transportation hooks which are adjustable at a variable distance relative to each other and rotate in a horizontal plane. The output of the sausage filling machine and the movement of the transportation belt are coordinated with the transportation means such that the incoming sausage chains which have already been twisted off fall in loops over the rotating hooks, which will then transport the loops over a smoke stick.

Machines of this type are capable of running at capacities of up to 30 sausages per second.

Similar devices of this type are e.g. described in the European patent application EP-A1-0189 763 and also in Swiss patent specification 598 766.

However, all of these machines, which substantially work automatically, have in common that they can work in a reliable manner when artificial casings are used that exhibit sufficient resistance, but are not suited for use in the making of natural skin sausages. As is generally known, it is much more complicated to process natural skins because of their substantially lower resistance to tearing, i.e. their increased sensitivity and their inherent variations as to thickness, length and shape.

Therefore, in the making of natural skin sausages it has so far been very difficult to use semiautomatically or fully automatically operating machines that transfer the sausage strings to a smoke stick. The procedure that is still employed nowadays in the production of natural skin sausages is predominantly of such a kind that natural intestine casings having normally a length of 3 to 20 m are slid over a filling tube and that sausage chains are then produced by intermittently or continuously operating the filling tube, the sausage chains being ejected directly onto a table arranged downstream of the filling tube so that the sausage chains are collected on the table in disordered fashion. The sausages are then hung manually by several operators standing around the table onto smoke sticks into desired loop sizes. The large number of personnel is here not the only disadvantage. There are also hygienic objections because intestine water of the natural skins collects there on the table because of the permanent accumulation of sausage chains.

In another known method the natural skin sausage chains are not ejected onto a table arranged next to the filling machine, but into a water vessel. The end of a sausage chain is then gripped by bystanding operators and placed onto a transportation belt which further transports the sausages and transfers them to smoke sticks.

SUMMARY OF THE INVENTION

It is the object of the present invention to provide a device which is suited for automatically or semiautomatically transferring chains of natural skin sausages to a smoke stick, so that less personnel is needed at the same output.

This object is achieved in a device of the above-mentioned type by a transportation means arranged downstream of the filling tube in the form of a rotating transportation belt including transportation hooks for the sausage loops and a transfer chute for supplying the sausage chains formed behind the filling tube into the transportation path of the transportation belt in such a manner they these hang in loops over the transportation hooks, with the transfer chute being formed and arranged downstream of the filling tube in such a manner that an access space which is substantially free around the forming sausage chain at least over approximately half the circumference is formed for an operator directly behind the filling tube.

Hence, in this solution use is made of a transportation means as is in principle known from the European application 482 368, but the sausages are tranferred directly behind the filling tube or a brake ring acting there by means of a chute into the path of the transportation hooks, which gives an operator the possibility of acting on the forming sausage chains directly behind the filling tube through the creation of an access space. Thanks to the creation of the free access space, an operator can already provide for an ordered supply to the transportation hooks in this area via the chute, so that intermediate storage is no longer needed on the table or in a water vessel, but a direct transfer to the transportation means is possible, the means then transferring the loops to a smoke stick, as described, for example, in the European patent application 482 368 as mentioned.

When the transfer chute is given the shape of a shell in a preferred embodiment, this will create the possibility of free access from above at any rate and a free space is created over half the circumference of the transfer chute where the sausages can form in a casual manner without skin bursting caused by overexcessive forced guidance.

In another advantageous development, the transfer chute is provided with a recess serving as an access space at the end facing the filling tube. This recess created in the lower path of the chute enables an operator to grip the forming sausage strings by hand from below and, especially in cases where the width of the recess in the axial direction of the chute is between 4 and 10 cm, to guidingly intervene with several fingers of his hand supportingly from below on the sausage strings, the sausages being then possibly also acted on with the thumb from above.

In another embodiment of the invention the transfer shell is arranged on a per se known holding arm which is positioned at the free end of the filling tube and used for a brake ring gear. In another embodiment the transfer chute can also be secured to the transportation means. This is especially the case when no brake ring gear is used. The chute will then be positioned accordingly by moving the transportation means to the filling tube.

The invention shall now be explained and described in the following with reference to the embodiment illustrated in the drawing.

DETAILED DESCRIPTION OF THIS INVENTION

Figure 1:
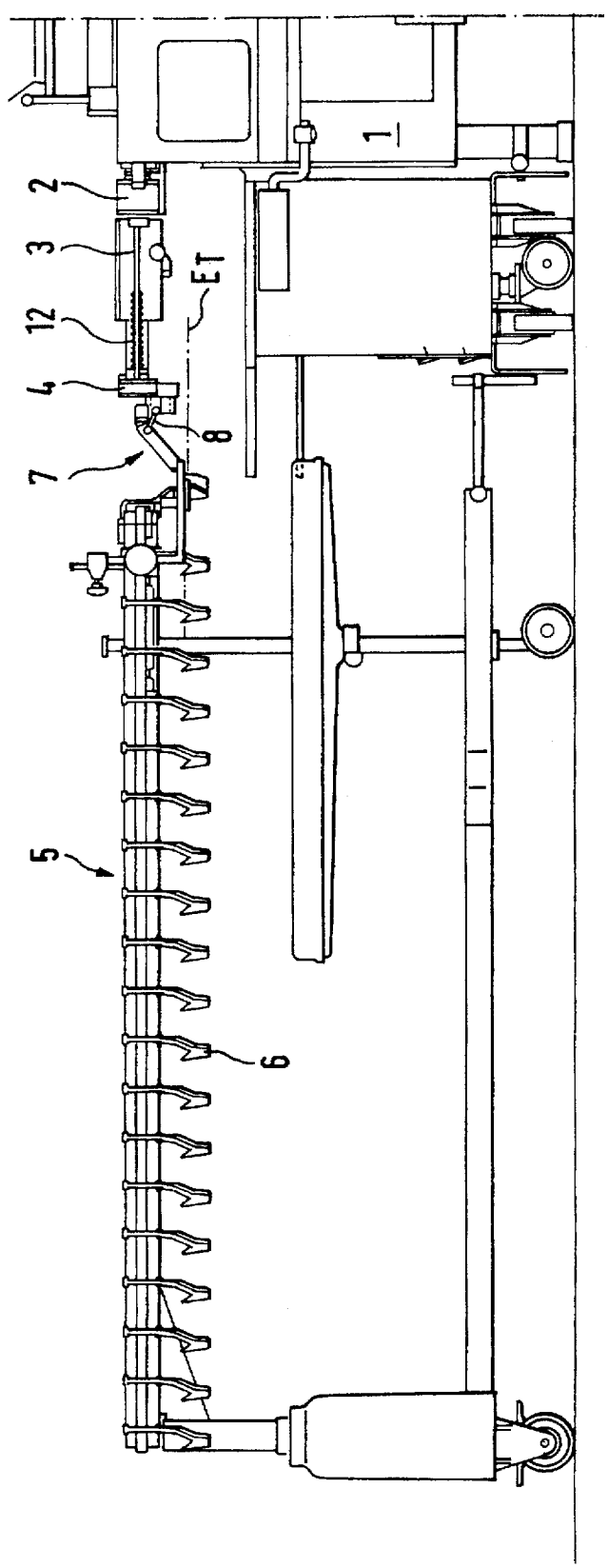
FIG. 1 shows a side elevational view of the apparatus incorporating the invention.

The basic construction of the device according to the invention is shown in FIG. 1. A filling and portioning machine which is designated by 1 on the whole and is capable of ejecting sausage meat through a filling tube 3 in portions or continuously can be seen. A skin worm 12 into which sausage meat is injected, whereby it is automatically pulled off from the filling tube 3 is slid over filling tube 3. To produce sausage chains with twisted-off portions, brake ring 4 which is pulled over the front end of filling tube 3 can produce neckings via the twist-off gear 2, resulting in sausage strings with subdivisions in specific sizes. A transfer chute 7 which is secured with the aid of a fixing device 8 to the housing of the brake ring 4 is arranged directly downstream of the filling tube 3. The transfer chute has arranged downstream thereof a transportation means 5 which is known per se and which in a horizontal plane $E_T$ comprises transportation hooks which are rotatingly arranged in spaced-apart relationship with one another. As for the detailed construction and operation of the transportation means, reference is made EP 482 368.

As shown in FIG. 1, the filling tube 3 is at a level above plane $E_T$ of the transportation hook path. The transfer chute is constructed such that it is inclined downwards and guides the forming sausage chains into the path of the continuously rotating transportation hooks, whereby sausage loops are formed.

Figure 2:
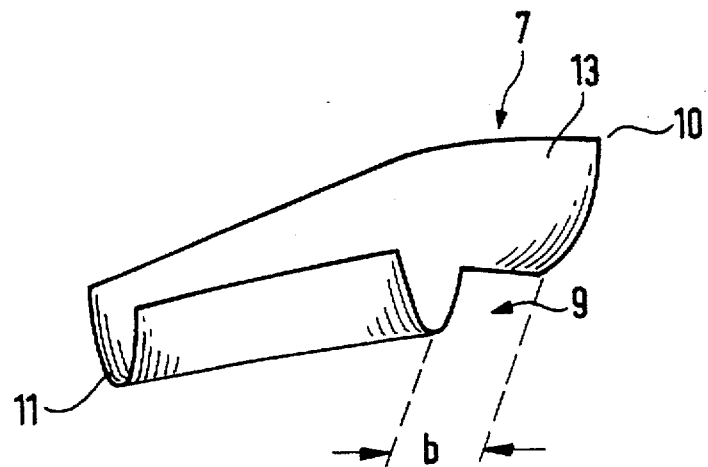
FIG. 2 shows a perspective view of the invention.
Figure 3:
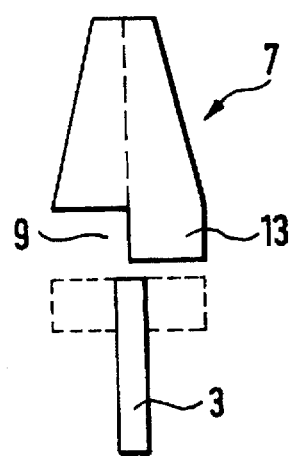
FIG. 3 shows a profile view of the invention.

The construction of the transfer chute is shown in more detail in FIGS. 2 and 3. The transfer chute illustrated in this embodiment consists of a shell, preferably made from plastics, which is provided at its end 10 at the filling tube side with an access space formed as a recess 9. Width b of recess 9 is preferably between 4 and 10 cm, so that the hand of an operator who guidingly intervenes with two to four fingers in the path of the ejected sausages with the back of his hand being oriented downwards can rest in this area. The sausage loops leave the chute at the end 11 which is oriented towards the transportation hooks.

In the top view of FIG. 3, recess 9 is shown even more distinctly. Wall 13 which circumferentially follows recess 9 ensures a certain guidance opposite to an operator's hand, but there is a large clearance for the exiting sausages due to the shell type construction and the upwardly open design of the transfer chute, so that skin bursting in natural skins can substantially be avoided. Since access from above is also possible in the area of the access space, the thumb of a hand can additionally form an upper guide, so that an operator can supportingly and guidingly intervene in an ergonomic and effective manner on the whole and can support the per se automatic transfer of the sausage chains to transportation hooks 6.

In case use is made of a transfer chute formed without a recess 9, the necessary access space can be formed by arranging the chute such that a distance approximately corresponding to width b is observed between the filling tube end and the end 10 of the chute provided at the filling tube side. In the illustrated embodiment, the transfer chute 7 is arranged on the housing of brake ring 4, as mentioned, but it may also be arranged on transportation means 5 and may be positioned on the filling tube when the transportation means is moved towards the portioning machine.

The use of a transfer chute according to the invention with free access space for an operator makes it possible to use a device which has otherwise been known, but could so far only be employed for automatically transferring sausages with artificial casings, for sausage strings with natural skins as well, with only one operator being needed to perform a control and monitoring function directly behind the filling tube in an easy manner. However, it is also possible to operate in the area of this access space with a flexible, possibly sensor-controlled guide aid, instead of an operator.

When the resultant natural skin sausage loops are hanging on hooks 6, an automatic transfer to a smoke stick may take place, for example by using hooks as are described in the European patent specification 482 368, which has been mentioned several times. The smoke stick, however, can also be threaded manually by an operator into the sausage chains hanging on hooks 6 in loops, and the sausage loops can then be removed upwards, hanging onto the sausage stick.

We claim:

1. A device for making and transferring natural skin sausages formed in coherent chains to a smoke stick, comprising a filling tube over which a natural casing or skin can be pulled to be filled with sausage meat, a transportation device (5) arranged downstream of said filling tube (5) in the form of a rotating transportation belt including transportation hooks (6) for sausage loops, and a transfer chute (7) for supplying the sausage chains formed behind said filling tube into the transportation path of said transportation hooks (6) in such a manner that said chains hang in the manner of loops over said transportation hooks, said transfer chute (7) being formed and arranged directly downstream of said filling tube (3) in such a manner that an access space (9) which is free around the forming sausage chain at least over a portion of said filling tube (9) at least large enough for fingers of an operator's hand directly behind said filling tube.

2. A device according to claim 1, wherein said transfer chute (7) is in the form of a shell.

3. A device according to claim 2, wherein said recess (9) has a width of 4 to 10 cm when viewed in the axial direction of said transfer chute (7).

4. A device according to claim 1, 2, or 3 further comprising a holding arm positioned at the free end of said filling tube (3) for a brake ring gear (4), and a fixing device (8), said transfer chute (8) being arranged by means of said fixing device (8) on said holding arm.

5. A device according to any of claim 1, 2, or 3, wherein said transfer chute (7) is secured to said transportation device (5).

* * * * *